US012704044B2

(12) United States Patent
Dogru et al.

(10) Patent No.: US 12,704,044 B2
(45) Date of Patent: Aug. 11, 2026

(54) METHOD OF HYDROCARBON RESERVOIR SIMULATION USING STREAMLINE CONFORMAL GRIDS

(71) Applicant: SAUDI ARABIAN OIL COMPANY, Dhahran (SA)

(72) Inventors: Ali Haydar Dogru, Dhahran (SA); Michel Cancelliere, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1078 days.

(21) Appl. No.: 17/810,233

(22) Filed: Jun. 30, 2022

(65) Prior Publication Data

US 2023/0003101 A1 Jan. 5, 2023

Related U.S. Application Data

(60) Provisional application No. 63/216,808, filed on Jun. 30, 2021.

(51) Int. Cl.
*E21B 41/00* (2006.01)
*G06F 30/20* (2020.01)
*G06F 113/08* (2020.01)

(52) U.S. Cl.
CPC .............. *E21B 41/00* (2013.01); *G06F 30/20* (2020.01); *E21B 2200/20* (2020.05); *G06F 2113/08* (2020.01)

(58) Field of Classification Search
CPC ...... E21B 41/00; E21B 2200/20; G06F 30/20; G06F 2113/08
USPC .......................................................... 703/10
See application file for complete search history.

(56) References Cited

U.S. PATENT DOCUMENTS

| | | | | |
|---|---|---|---|---|
| 9,208,268 | B2 * | 12/2015 | Fung | G06F 30/20 |
| 2005/0021234 | A1 | 1/2005 | Han | |
| 2013/0346040 | A1 | 12/2013 | Morales German et al. | |
| 2020/0340353 | A1 * | 10/2020 | Ding | E21B 47/022 |

OTHER PUBLICATIONS

Aldawood_2011 (integrated pre-well planning process improves service quality and decreases risk through cooperation between drilling and geosciences, SPE 140023 copyright 2011). (Year: 2011).*

(Continued)

*Primary Examiner* — Brian S Cook
(74) *Attorney, Agent, or Firm* — Osha Bergman Watanabe & Burton LLP

(57) ABSTRACT

A system and method of simulating fluid flow in a hydrocarbon reservoir is disclosed. The method includes obtaining a coarse grid model of the hydrocarbon reservoir and a trajectory of a wellbore that penetrates the hydrocarbon reservoir, and determining an initial grid geometry surrounding the trajectory. The method further includes constructing a reservoir simulation grid, conformal to the initial grid geometry in a first region in a vicinity of the wellbore and conformal with the coarse grid model in a second region more distant from the wellbore than the first region, and performing a hydrocarbon reservoir simulation, modeling a flow of fluid in the hydrocarbon reservoir based, at least in part, on the reservoir simulation grid.

17 Claims, 15 Drawing Sheets

(56) References Cited

OTHER PUBLICATIONS

Panja_2013 (Grid sensitivity studies in hydraulically fractured low permeability reservoirs, Journal of Petroleum Science and Engineering 112 (2013) 78-87). (Year: 2013).*
Kareem_2015 (A simplified semi-analytical productive index for a horizontal well with a non-linear trajectory in a vertical plane, Energy Exploration & Exploitation vol. 33, No. 6, 2015 pp. 785-898). (Year: 2015).*
Pedrosa_1986 (Use of a Hybrid Grid in Reservoir Simulation, SPE Reservoir Engineering, Nov. 1986). (Year: 1986).*
K. Singh and C. H. Whitson; "Gas-Condensate Pseudopressure in Layered Reservoirs", SPE-117930; SPE Reservoir Evaluation & Engineering; vol. 13; Issue 2; Apr. 2010; pp. 203-213 (11 pages).
International Search Report and Written Opinion issued in International Patent Application No. PCT/US2022/035827, mailed on Sep. 30, 2022 (12 pages).
Office Action issued in Saudi Arabian Application No. 1120230072, mailed on Oct. 23, 2025 (8 pages).

* cited by examiner

METHOD OF HYDROCARBON RESERVOIR SIMULATION USING STREAMLINE CONFORMAL GRIDS

BACKGROUND

In simulations, properties for various cells may be averaged to produce a coarse grid. However, if not applied properly, averaging may provide a solution in a model that may lose accuracy as the details are lost in the process, especially where averaging is applied to highly influential grid-cells. Thus, accurate simulations may require a model that reduces the computational time to an acceptable speed while also preserving relevant physical relationships in the underlying data.

In reservoir simulation the reservoir domain may be divided into sub-domains called grid cells and reservoir variables such that pressure and fluid composition and saturations are calculated for each cell as a function of production time. Based on these predictions, maps of the movement of water, gas and oil are generated throughout the reservoir with production time. The calculated movements of fluids within the reservoir are affected by the selection of the grid cell size and shape. Typically, smaller the grid cells give the more accurate prediction of fluid movement and more accurate predictions of the arrival time ("breakthrough") of fluids at production wells. Accurate timing of water or gas breakthrough at wells is important information for the field management for designing surface separation facilities, and therefore, estimating the size of required investments.

However, smaller grid cells increase the number of unknown variables, such as the pressure and saturation in each cell, to be determined by the reservoir simulator and, therefore, require more computational time. In some cases, for example the simulation of a gas condensate reservoir, accurate simulation of some reservoir problems requires extremely small grid cell sizes. This may be impractical for simulating fields with long histories or forecast times. Prior to hydrocarbon production, gas condensate or wet gas reservoirs contain only gas in vapor state. During the production of the gas through production wells, reservoir pressure drops continuously. The largest pressure drops are observed around the production wells. Liquids, mostly oil, precipitate from the vapor phase forming a liquid zone around the wellbore when the pressure drops below a critical pressure, the "dew point" pressure. This process is often referred to as "liquid drop-out" inside the reservoir. These liquids, mostly oil, are light in molecular weight and are called "condensates". Condensates typically flow much less easily than vapor through the reservoir and, thus, the accumulation of condensate around production wells restricts the flow of gas from the reservoir into the wellbore. This causes productivity to decline from the wells and a failure to deliver the desired gas rates. Although dropped condensates around the wellbore may be removed by interventions including injecting chemicals or fracturing the reservoir rock, intervention operations are both expensive and often not completely successful removing the condensates.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of simulating fluid flow in a hydrocarbon reservoir is disclosed. The method includes obtaining a coarse grid model of the hydrocarbon reservoir and a trajectory of a wellbore that penetrates the hydrocarbon reservoir and determining an initial grid geometry surrounding the trajectory. The method further includes constructing a reservoir simulation grid, conformal to the initial grid geometry in a first region in a vicinity of the wellbore and conformal with the coarse grid model in a second region more distant from the wellbore than the first region, and performing a hydrocarbon reservoir simulation, modeling a flow of fluid in the hydrocarbon reservoir based, at least in part, on the reservoir simulation grid.

In general, in one aspect, embodiments relate to a non-transitory computer readable medium storing instructions executable by a computer processor, the instructions include functionality for obtaining a coarse grid model of a hydrocarbon reservoir and a trajectory of a wellbore that penetrates the hydrocarbon reservoir and determining an initial grid geometry surrounding the trajectory. The instructions further include functionality for constructing a reservoir simulation grid, conformal to the initial grid geometry in a first region in a vicinity of the wellbore and conformal with the coarse grid model in a second region more distant from the wellbore than the first region, and performing a hydrocarbon reservoir simulation, modeling a flow of fluid in the hydrocarbon reservoir based, at least in part, on the reservoir simulation grid.

In general, in one aspect, embodiments relate to a system. The system includes a reservoir simulator and a well planning system. The reservoir simulator is configured to obtain a coarse grid model of a hydrocarbon reservoir and a trajectory of a wellbore that penetrates the hydrocarbon reservoir and to determine an initial grid geometry surrounding the trajectory. The reservoir simulator is further configured to construct a reservoir simulation grid, conformal to the initial grid geometry in a first region in a vicinity of the wellbore and conformal with the coarse grid model in a second region more distant from the wellbore than the first region and perform a hydrocarbon reservoir simulation, modeling a flow of fluid in the hydrocarbon reservoir based, at least in part, on the reservoir simulation grid, and develop a hydrocarbon reservoir production plan. The well planning system is configured to determine a planned wellbore trajectory based upon the hydrocarbon reservoir production plan.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Predicting the distribution of oil, gas and water within the reservoir and production rates of these fluids as a function of time from the commencement of production are of great importance. Accurate prediction of oil, gas, and water distributions and production rates have previously required very finely gridded simulation models particularly around horizontal and fractured wellbores. Such models frequently require so much computer time as to be impractical.

Some embodiments are directed to a simulation model grid that combines grids at least approximately congruent with isobars and streamlines in the vicinity of horizontal and fractured wellbores with a coarse grid model far from the wellbores. Such combined simulation grids may be shown to be almost as accurate as finely gridded simulation model while requiring approximately the same computational time as more coarsely gridded models.

Figure 1:
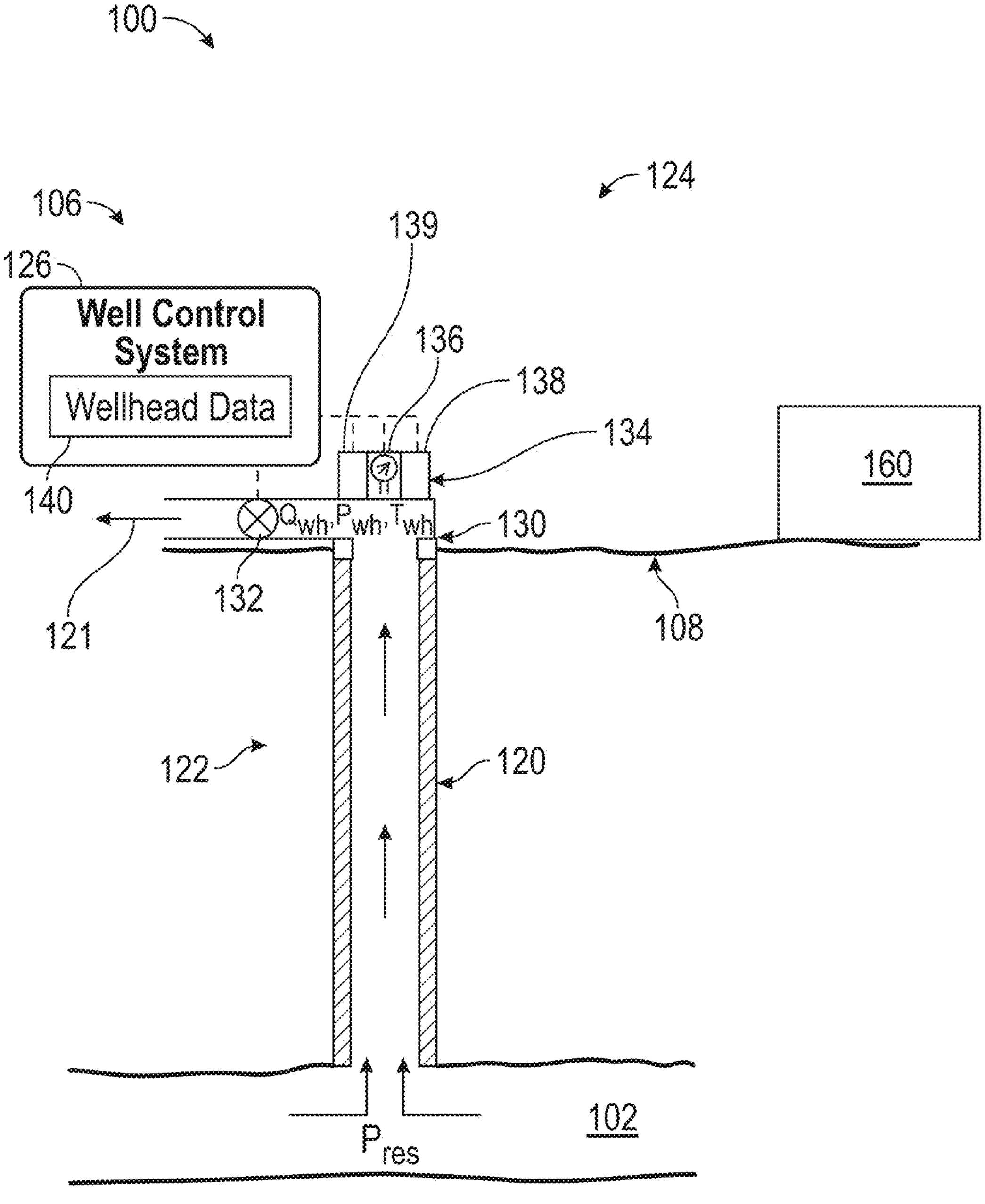
FIG. 1 shows system in accordance with one or more embodiments.

FIG. 1 shows a schematic diagram in accordance with one or more embodiments. FIG. 1 illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability and porosity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). The control system (126) may control various operations of the well system (106), such as well production operations, well completion operations, well maintenance operations, as well as reservoir operations including monitoring, assessment and development operations. In some embodiments, the control system (126) includes a computer that is the same as or similar to that of computer system (1302) described below in FIG. 13 and the accompanying description.

The wellbore (120) may include a bore hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well system (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well system (106) to assess a relatively current state of the well system (106), and make real-time decisions regarding development of the well system (106) and the reservoir (102), such as on-demand adjustments in regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "cell") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature, and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124) after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{WH}$). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) ($Q_{WH}$) passing through the wellhead (130).

In some embodiments, the well system (106) includes a reservoir simulator (160). For example, the reservoir simulator (160) may include hardware and/or software with functionality for generating one or more reservoir models regarding the hydrocarbon-bearing formation (104) and/or performing one or more reservoir simulations. For example, the reservoir simulator (160) may store well logs and data regarding core samples for performing simulations. A reservoir simulator may further analyze the well log data, the core sample data, seismic data, and/or other types of data to generate and/or update the one or more reservoir models. While the reservoir simulator (160) is shown at a well site, embodiments are contemplated where reservoir simulators are located away from well sites. In some embodiments, the reservoir simulator (160) may include a computer system that is similar to the computer system (1302) described below with regard to FIG. 13 and the accompanying description.

Figure 2A:
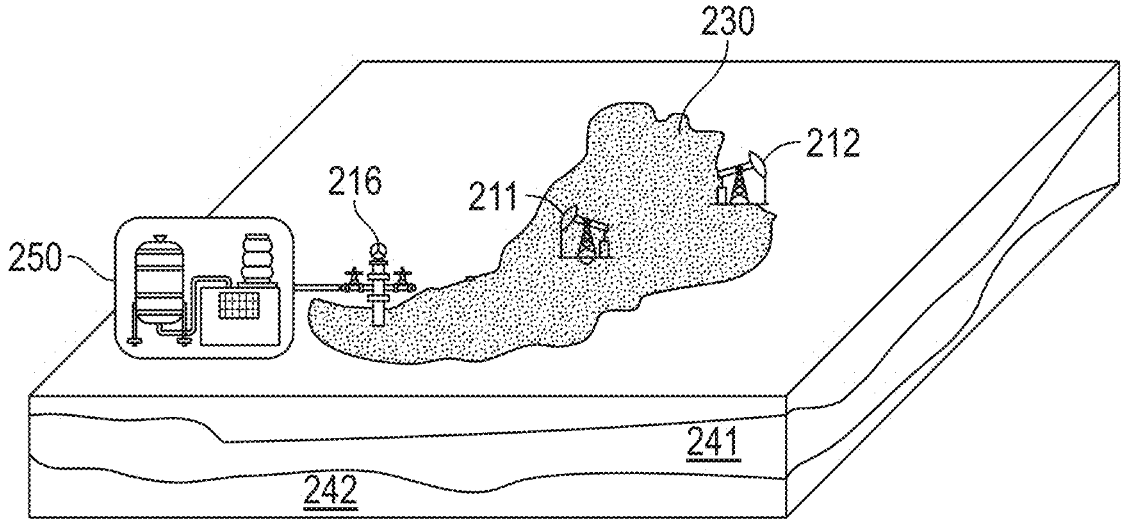
FIGS. 2A and 2B show systems in accordance with one or more embodiments.

FIG. 2A shows a schematic diagram in accordance with one or more embodiments. FIG. 2A shows a geological region (200) that may include one or more hydrocarbon reservoir regions (e.g., reservoir region (230)) with various production wells (e.g., production well A (211), production well (212)). For example, a production well may be similar to the well system (106) described above in FIG. 1 and the accompanying description. Hydrocarbons, such as oil, gas, or a combination of both, may be produced from hydrocarbon reservoir through the production wells. The hydrocarbon may then transported to a primary processing facility, such as a gas-oil separation plant ("GOSP") via surface pipelines (not shown) or stored in tanks (not shown) near the production wells for later transportation by tanker trucks.

Likewise, a reservoir region may also include one or more injection wells (e.g., injection well C (216)) that include functionality for enhancing production by one or more neighboring production wells. Production may be enhanced by injection fluid, such as water, from pumping systems (e.g., pumping system (250)) through the injection wells into the hydrocarbon reservoir. The injected fluid may be wastewater from a GOSP or drawn from nearby aquifers and may enhance production by increasing or maintaining the fluid pressure in the reservoir and/or by pushing the hydrocarbon through the hydrocarbon reservoir towards the production wells.

As shown in FIG. 2A, wells may be disposed in the reservoir region (230) above various subsurface layers (e.g., subsurface layer A (241), subsurface layer B (242)), which may include hydrocarbon deposits. In particular, production data and/or injection data may exist for a particular well, where production data may include data that describes production or production operations at a well, such as wellhead data (142) described in FIG. 1 and the accompanying description.

Pumping systems may pump fluid according to a schedule defined in a hydrocarbon reservoir production plan. Similarly, productions well may be produced at flow rates determined by the hydrocarbon reservoir production plan. In some cases, additional production and/or injection wells may be drilled according to the hydrocarbon reservoir production plan. The hydrocarbon reservoir production plan may be formed based on data about the reservoir, such as seismic data and well log data, and on production and injection data recorded over the lifetime of the hydrocarbon reservoir. A reservoir simulator (160) may use the reservoir data arranged on a reservoir grid model, production data, and injection data to predict the future performance of the reservoir, such as expected production rates, and to simulate various future scenarios. For example, the reservoir simulator (160) may predict the future production of a new production well drilled at a future data, or the effect on the production of all the production wells caused by increasing fluid injection rate at one or more injection wells. Further, the reservoir simulator may predict the reservoir pressure as a function of position within the reservoir and time. This information may be critical in understanding the behavior or condensate or wet gas reservoirs and understanding when oil condensate with form as the reservoir pressure falls. These scenarios may be used by reservoir engineers managing hydrocarbon to form the hydrocarbon reservoir production plan.

Figure 2B:
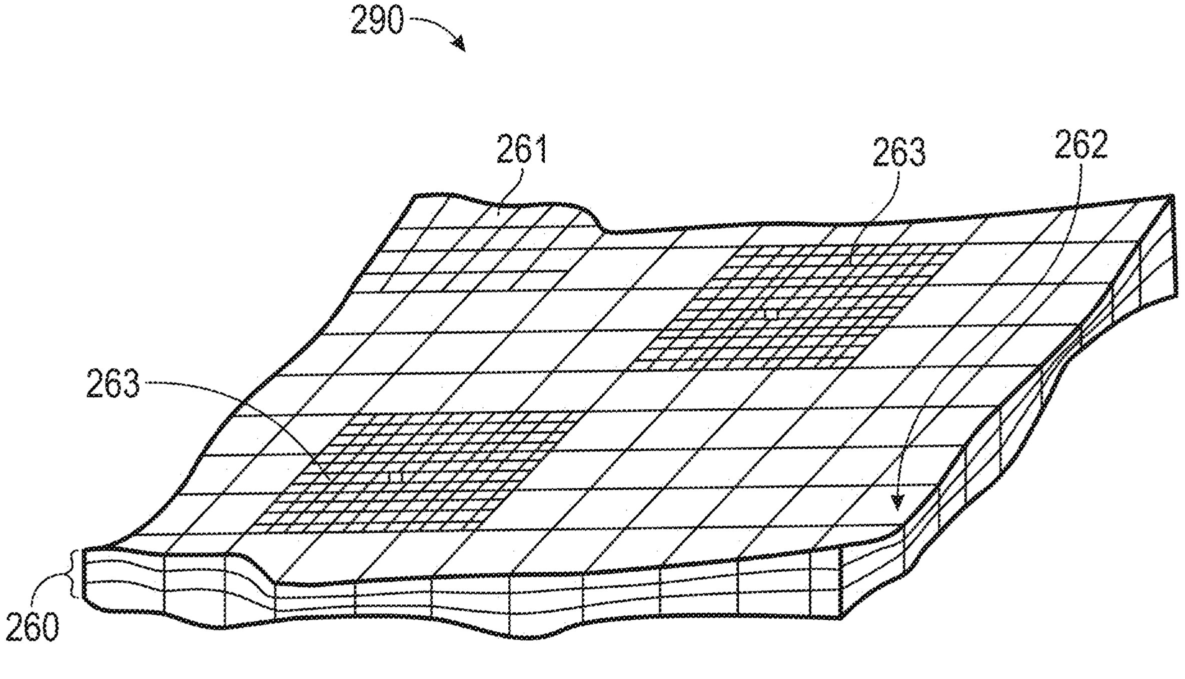

In accordance with one or more embodiments, FIG. 2B shows a reservoir grid model (290) that corresponds to the geological region (200) from FIG. 2A. More specifically, the reservoir grid model (290) includes grid cells (261) that may refer to a coarse grid cell (262) of a reservoir grid model as well as fine grid cells (263) that may refer to a subdivision of coarse grid cells (262) of the reservoir grid model (290). For example, if a coarse grid cell (262) may be of size 1×1, the fine grid cells (263) may be of sizes ½×½, ¼×¼, or ⅛×⅛. Grid cells (261), fine grid cells (263), and the coarse grid cells (262) may correspond to columns for multiple model layers (260) within the reservoir grid model (290). The grid cells (261), coarse grid cells (262) and fine grid cells (263) may or may not be cubic. Typically, the size of the grid cells in the horizontal directions and much greater than the size of the grid cells in the vertical direction.

Predicting the performance of a condensate or wet gas reservoir is of paramount interest for gas producers. Generally, reservoir simulators are used to predict the gas production rates from the wells. For a reliable prediction of the gas production rate, it is critical for the simulator to model the liquid drop-out process properly. To achieve this, reservoir simulators with capable of having a full description of the fluid composition and very fine grid cells around the wellbore may be required. The size of these very fine grid cells may be of the order of a few feet. As a result, the computation times required to complete the simulation may frequently be impractical.

In practice, models composed of coarse grid cells, with horizontal sizes on the order of hundreds of feet, may be used to simulate models covering the full reservoir and containing many wellbores. These models are computationally tractable but cannot accurately calculate low pressures and steep pressure gradients around the wellbores. Consequently, these models typically fail to simulate liquid drop-out around the wellbores accurately and consequently often over-predict gas production rates.

In accordance with one or more embodiments, a hydrocarbon reservoir may be composed of a porous and permeable rock, a mobile non-ideal gas that may flow though the rock, and immobile liquids whose flow through the rock is negligible compared to the gas. To model the behavior of such a hydrocarbon reservoir a multiphase multi-component simulator may be required. In the vicinity of a producing gas well the flow of gas may be described by the following nonlinear partial differential equation with the associated boundary and initial condition:

$$\sum_{j=1}^{n_p} \nabla \cdot \frac{n_{i,j}}{N_j}\rho_j\lambda_j K \nabla \Phi_j + q_i = \frac{\partial n_i}{\partial t} \qquad \text{Equation (1)}$$

where $\Phi_j$ is the fluid potential for the j-th fluid phase:

$$\Phi_j = p_j - \frac{g}{g_c}\overline{\rho}_j(z - z_{ref}) \qquad \text{Equation (2)}$$

and $p_j$ is the pressure for the j-th fluid phase (j enumerates oil, water, or gas), $n_p$ is the number of fluid phases, $n_{i,j}$ is the total number of moles of the i-th component in j-th fluid phase. $N_j$ is the total number of moles in the j-th fluid phase, $\rho_j$ is the molar density of the j-th fluid phase, K is the absolute permeability tensor, and $q_i$ is the production or injection rate of the i-th component into the reservoir. ∇. is the divergence operator, ∇ is the gradient operator, and t is time.

The phase mobility of the j-th fluid phase, $\lambda_j$, may be determined by:

$$\lambda_j = \frac{k_{r,j}}{\mu_j} \qquad \text{Equation (3)}$$

where $k_{r,j}$ is the relative permeability and $\mu_j$ is the viscosity of the j-th fluid phase. The total number of moles in the j-th fluid phase, $N_j$, is given by:

$$N_j = \Sigma_{i=1}^{n_c} n_{i,j} \qquad \text{Equation (4)}$$

where $n_c$ is the number of components in the j-th fluid phase.

$$f^j_i(n_i, p_j, T) = f^{j'}_i(n_i, p_{j'}, T). \qquad \text{Equation (5)}$$

The pore volume (of a reservoir grid cell) may be determined by:

$$V_p = \sum_{j=1}^{n_p} \frac{N_j}{\rho_j} \qquad \text{Equation (6)}$$

where $\rho_j$ is the density of the i-th component:

$$\rho_j = \sum_{i=1}^{n_c} \frac{n_{i,j}}{N_j}\rho_i. \qquad \text{Equation (7)}$$

the viscosity of the j-th fluid phase:

$$\mu_j = \sum_{i=1}^{n_c} \frac{n_{i,j}}{N_j}\mu_i, \qquad \text{Equation (8)}$$

and $N_i$ is the total number of moles of the i-th component:

$$N_i = \Sigma_{j=1}^{n_p} n_{i,j}. \qquad \text{Equation (9)}$$

The capillary pressure between the j-th and the j'-th phase, for j≠j' is given by:

$$p_{cj,j'} = p_j - p_{j'} \qquad \text{Equation (10)}$$

and the phase saturation for the j-th phase is:

$$S_j = \frac{\frac{N_j}{\rho_j}}{\sum_{j=1}^{n_p} \frac{N_j}{\rho_j}}. \qquad \text{Equation (11)}$$

In accordance with one or more embodiments, to solve equations (1)-(11) boundary conditions may be defined. An initial boundary condition may specify a partial pressure for each fluid phase as a function of position:

$$p_j(x,y,z,0) = g_j(x,y,z) \qquad \text{Equation (12)}$$

where x, y, and z are spatial coordinates and $g_j$ may allow, for example, for the gas partial pressure to be larger at the top of the reservoir and the water partial pressure to be larger at the bottom of the reservoir.

Further, in accordance with one or more embodiments, boundary conditions for any producing or injecting well may be specified. For example, the gradient of pressure normal to the reservoir domain boundary, ∂Ω, may be taken to be zero:

$$\frac{\partial p}{\partial \vec{s}} = 0, \text{ on } \partial\Omega \quad \text{Equation (13)}$$

or or the pressure may be assumed to be constant on the boundary of the reservoir domain, Ω:

$$p=p_B, \text{ on } \partial\Omega \quad \text{Equation (14)}$$

where $\vec{s}$ is the unit area vector normal to the boundary ∂Ω and the $p_B$ is a specified boundary pressure.

In accordance with one or more embodiments, equations (1)-(14) are solved to find the unknown pressure of the i-th phase, $p_j(x, y, z, t)$ and the unknown molar volume of the i-th component, $n_i(x, y, z, t)$, as a function of space and time, $t\in[0,T]$ where T is the total production time simulated. To solve the equations (1)-(14) for the unknowns the reservoir domain may be discretized into sub-domains (grid cells (261)) and the simulation time duration between [0, T] may be divided into sub-elements, Δt. In some embodiments, Δt may be constant and in other embodiments, Δt may vary with throughout the simulation time. The discretization may result in a set of discrete nonlinear first-order differential equations. In accordance with one or more embodiments, the discrete system may be linearized and solved for any simulation time interval [0, T] using a nonlinear iterative scheme. This iterative solution may result in pressure, and molar distribution within the reservoir at any time within the simulation time interval [0, T]. The result of solving equations (1)-(14) for the production time interval [0, T] may be referred to as a multiphase multi-component simulation.

In accordance with one or more embodiments the multiphase multi-component simulation may be performed using a coarse grid model spanning the whole, or a large portion, of the hydrocarbon reservoir. The coarse grid model may have coarse grid cells (262) that are of the order of hundreds of feet in horizontal extent although they may be much thinner in the vertical direction. Such a coarse grid model may be computationally tractable but may give unreliable or inaccurate results close to a production well (e.g., production well A (211) and production well B (212)) or an injection well (e.g., injection well C (216)). Never-the-less, the multiphase multi-component simulation may provide an estimate of the shape and position of isobars within a reservoir model.

In some embodiments, an initial grid geometry may be defined around a trajectory of wellbore in the reservoir model. The initial grid geometry may be selected to be conformal to the isobars calculated by the coarse-grid simulation in the vicinity of a wellbore trajectory. One horizontal axis of the conformal to initial grid geometry may be parallel to the isobars and the second horizontal axis of the initial grid geometry may be orthogonal to the isobar (or equivalently parallel to the streamlines calculated by the coarse grid close to the wellbore trajectory.

In other embodiments, the initial grid geometry around a trajectory of wellbore in the reservoir model may be determined using an a priori approximation. For example, it is well known that for a vertical wellbore penetrating a homogeneous reservoir the isobars form concentric circles in the horizontal plane with the centers of the circles coincident with the center of the wellbore and the streamlines extend radially away from the wellbore. In contrast, for a horizontal wellbore the isobars may approximate ellipses in the horizontal plane with the streamlines everywhere locally orthogonal to the ellipses. Similarly, for a vertical wellbore in fluid communication with a highly permeable vertical fracture the isobars may approximate ellipses surrounding the vertical fracture in the horizontal plane with the streamlines everywhere locally orthogonal to the ellipses. Although in heterogeneous reservoirs, the isobars and streamlines may not form perfect geometrical figures, i.e., circles or ellipses, even in heterogenous reservoirs geometrical figures may be a better approximation to the isobars and streamlines than can be achieved with cartesian coordinate axes. In these cases, a first horizontal axis of the model grid may be chosen to be conformal to ellipses and a second horizontal axis of the model grid may be conformal to the direction orthogonal to the ellipses.

Figure 3A:
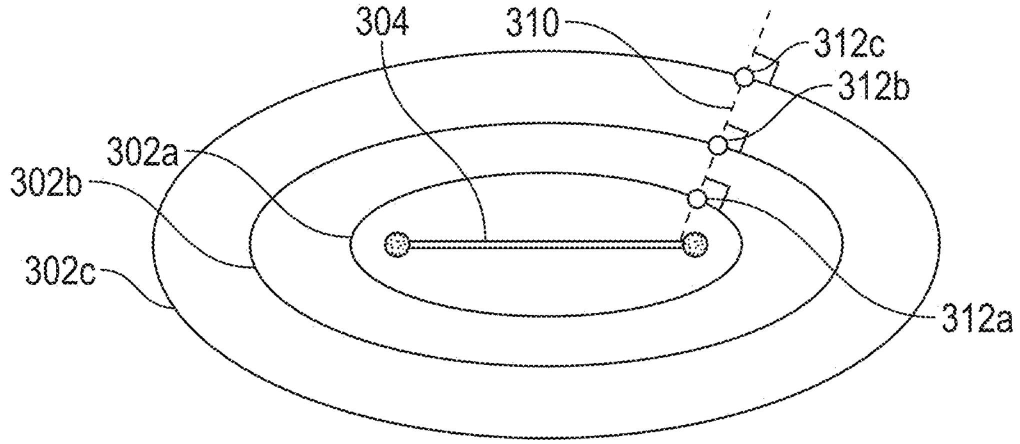
FIGS. 3A and 3B show isobars and streamlines in accordance with one or more embodiments.

FIG. 3A, in accordance with one or more embodiments, depicts three isobars (302*a*, 302*b*, 302*c*) surrounding a horizontal wellbore (306). In some embodiments there may be more than three isobars and in other embodiments there may be fewer without departing from the scope of the invention. In some embodiments, the isobars (302*a*, 302*b*, 302*c*) may be ellipses. A streamline (310) intersects the outermost isobar (302*c*) at a 90-degree angle at a point (312*c*). The same streamline (310) intersects the middle isobar (302*b*) at a 90-degree angle at a point (312*b*) and the innermost isobar (302*a*) at a 90-degree angle at a point (312*a*). The streamline (310) represents the path that fluid beginning at point (312*c*) would follow if fluid were being produced from the reservoir at the horizontal wellbore (304) and the reservoir was homogeneous.

In accordance with some embodiments, an elliptical isobar may be described by $$ax^2+by^2+cxy+dx+ey=f \quad \text{Equation (15)}$$

where x and y represent the horizontal cartesian coordinates of points on the isobar and f is the pressure value on the isobar. The coefficients a, b, c, d, and e may be estimated from a cartesian grid solution to Equations (1)-(14), or for an isolated well in a homogeneous reservoir from an analytic solution.

In accordance with one or more embodiments, a streamline may be determined starting from the point (312*c*). For example, the slope of isobar (302*c*) may be written as:

$$\frac{dy}{dx} = -\frac{2ax + cy + d}{cx + 2by + e} \quad \text{Equation (16)}$$

and using the fact that the scalar product of two orthogonal lines is equal to −1 to obtain:

$$\frac{dy_s}{dx} = \frac{cx + 2by_s + e}{2ax + cy_s + d} \quad \text{Equation (17)}$$

where $y_s$ is the y-coordinate of the streamline (310) at the point (312*c*). Thus, the equation for this orthogonal streamline may be written as:

$$y_s = y_c + \frac{dy_s}{dx}(x_s - x_c) \quad \text{Equation (18)}$$

Where $x_s$ is the x-coordinate of points on the streamline, and $x_c$ and $y_c$ are the coordinates of point (312*c*).

Figure 3B:
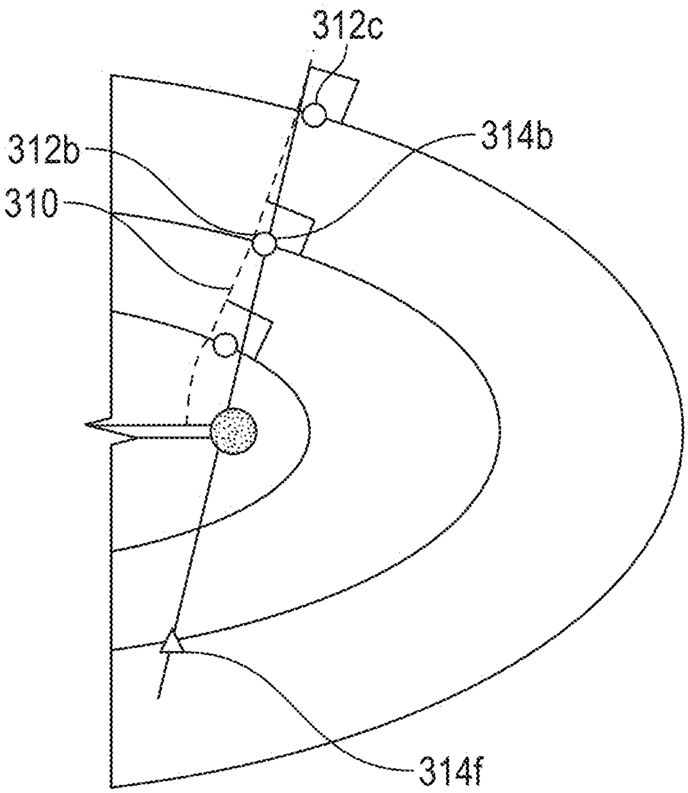

In accordance with one or more embodiments, the intersection point (314*b*) of the line given by Equation (18) and the isobar (302*b*) may now be determined by solving Equation (18) and:

$$ax^2+by^2+cxy+dx+ey=f_b \quad \text{Equation (19)}$$

as shown in FIG. 3B and where $f_b$ defines the pressure on isobar (302*b*). Note, intersection point (314*b*) is an approximate determination of the point (312*b*) where the streamline (310) actually intersects with the isobar (302*b*). The solution of Equation (17) and Equation (18) yields two intersection points (314*b*) and (314*f*) where the line defined by equation (17) intersects the "far side" of the isobar (302*b*). In accordance with one or more embodiments the selected intersection point is the intersection point that is closest to the point (312*c*).

Figure 4:
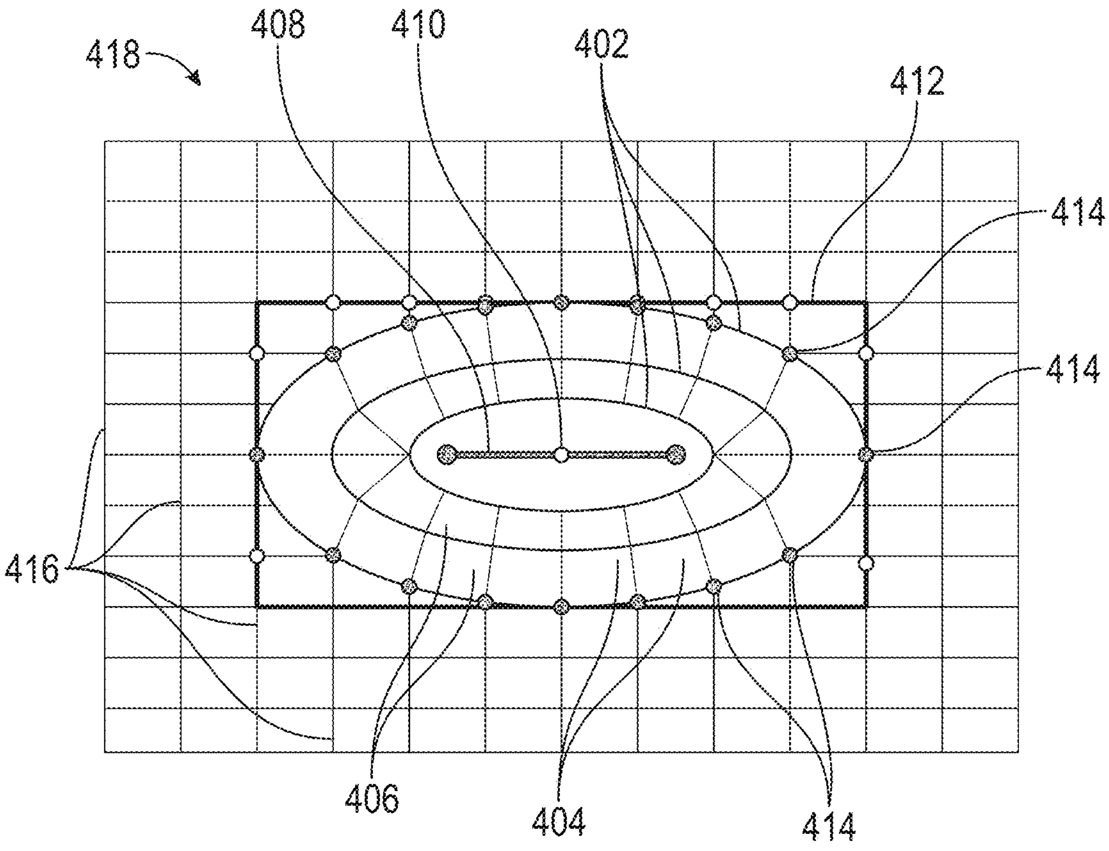
FIG. 4 shows a system in accordance with one or more embodiments.

Constructing a reservoir simulation grid may require the integration of the initial grid geometry around one or more well trajectories with the coarse grid spanning all, or a large portion, of the reservoir. FIG. 4 depicts the integration of an elliptical initial grid geometry with a cartesian coarse grid. The elliptic grid (402) and the associated streamlines (404) are centered on a horizontal well (408). The interval between the streamlines (404) may be called stream-tube grids (406), in accordance with one or more embodiments. To generate such a grid a reference coordinate system is first selected. For example, in FIG. 4 the straight, horizontal well (408) defines the x-axis and the center of the horizontal well (410) is taken as the x=y=0 origin. Next, the number of ellipses is selected. In FIG. 4 three ellipses are selected. In accordance with some embodiments, ellipses may be chosen by fitting equation (15) to the pressure contours computed by a coarse grid simulator. In accordance with other embodiments, the isobar can be obtained by solving a Poisson equation for pressure equation around the well using a steady state assumption.

FIG. 4 further depicts, in accordance with one or more embodiments, a bounding box (412). The bounding box (412) encloses outer most ellipse such that the edges of the bounding box (412) are tangent to the outermost ellipse at the points x=0 and y=0. In some embodiments, the nodes on the outermost ellipse that may form the starting point of each streamline (414) may be determined by where the x=constant lines (416) that define the coarse modeling grid (418) outside the bounding box (412) intersect the outermost ellipse. Equally, in other embodiments the intersection of the y=constant lines may determine the starting point of each streamline.

In one or more embodiments, this approach to gridding the area within the bounding box (412) but outside the outermost ellipses may result in an irregular transitional grid, as depicted in FIG. 4. The transitional grid may have cells with 3 corners or 5 corners, but typically this may be accommodated by reservoir simulation algorithms that routinely use unstructured grid formats.

Figure 5:
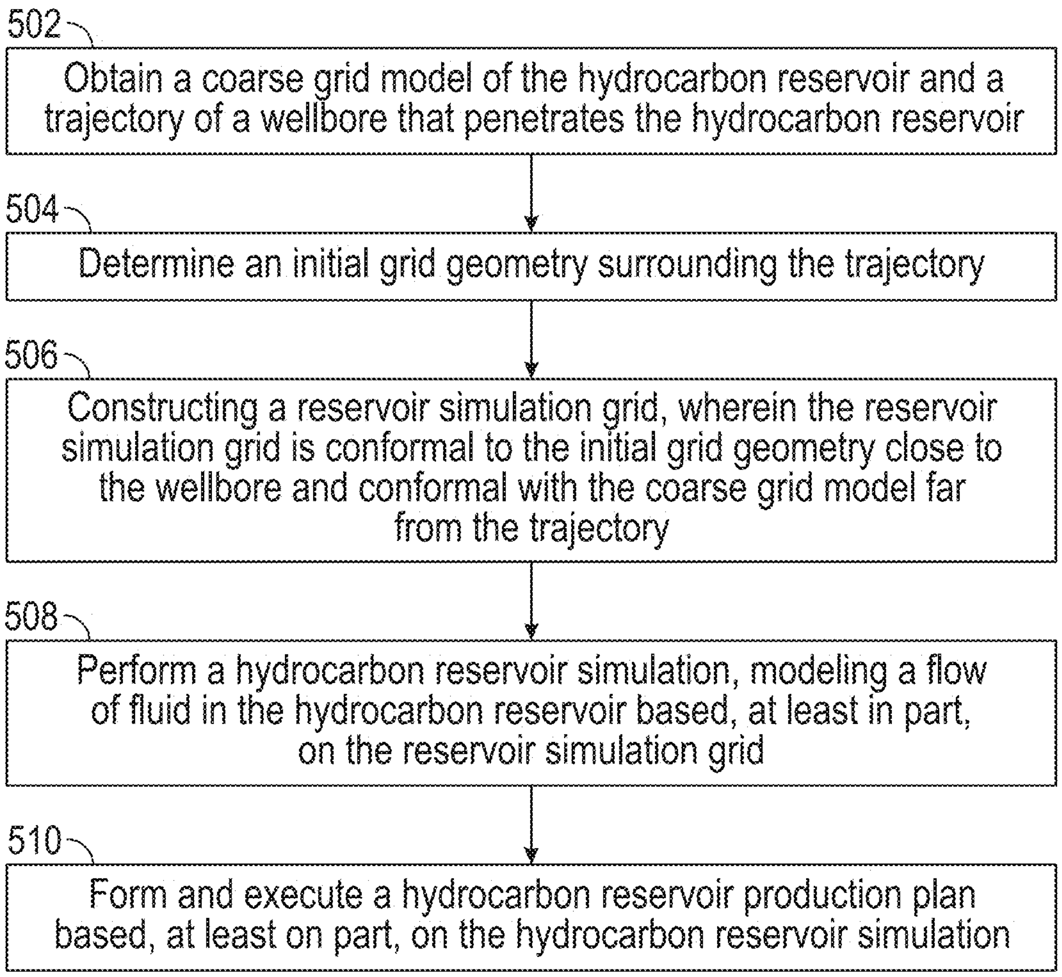
FIG. 5 shows a flowchart in accordance with one or more embodiments.

FIG. 5 shows a flowchart in accordance with one or more embodiments. The flowchart describes the steps that may be taken to define a reservoir simulation grid, simulated fluid flow in the reservoir using the reservoir grid, and form, revise, and execute a reservoir production plan based upon the reservoir simulation.

In Step 502 a coarse grid model of the hydrocarbon reservoir and a trajectory of a wellbore that penetrates the hydrocarbon reservoir may be obtained. The coarse grid may contain porosity and permeability values for the reservoir rocks and fluid phase and composition values for the fluids within the pores. The coarse grid model may also include the location and trajectories of a plurality of existing or planned wellbores and one or more planned production scenarios. In some embodiments, the coarse grid model may be defined on a cartesian grid.

In Step 504, an initial grid geometry surrounding the trajectory may be determined. In some embodiments, the initial grid geometry may be determined, at least in part, from isobars of a coarse-grid simulation. In other embodiments, a first horizontal axis of the initial grid geometry may be an ellipse. In some embodiments, a second horizontal axis of may be locally orthogonal to the first horizontal axis. The initial grid geometry may be determined from numerical or analytical solutions to canonical or simplified models of the reservoir in the vicinity of the segment of the wellbore trajectory within the hydrocarbon reservoir. For example, the reservoir may be assumed to be locally homogeneous in the vicinity of the horizontal wellbore.

In Step 506, in accordance with one or more embodiments, a reservoir simulation grid may be constructed. The reservoir simulation grid may be constructed to be conformal to the initial grid geometry in a first region in a vicinity of the wellbore and conformal with the coarse grid model in a second region more distant from the wellbore than the first region. The boundaries of cells of the reservoir simulation grid near the wellbore may be exactly, or approximately, coincident with isobars and streamlines of the simulated fluid flow. If the isobar was determined from a numerical or analytic solution to a canonical or simplified model, then the isobar may be an ellipse.

In accordance with one or more embodiments, in Step 506 the intersection of the outermost, largest ellipse, with the edges of the coarse grid cells having at least one orientation may be determined. For example, in some embodiments the intersection of the largest ellipse with the edges having x=constant may be determined. In other embodiments, the intersection of the largest ellipse with the edges having y=constant may be determined. Alternatively, the intersection of the largest ellipse with the edges running North-South may be determined. A streamline may be determined starting at each of the intersection and crossing each of the concentric ellipses orthogonally.

Stream-tubes may be determined, in accordance with one or more embodiments. Each stream-tube may be bounded on either side by an approximation to adjacent streamlines. The boundary of the stream-tube may be determined by tracing a line orthogonally to the outermost ellipse from an intersection point inward to the point at which the orthogonal line intersects the next largest ellipse. Then the procedure may be repeated iteratively to find the intersection point with the next concentric ellipse.

In accordance with one or more embodiments, in Step 508 a hydrocarbon reservoir simulation, modeling a flow of fluid in the hydrocarbon reservoir based, at least in part, on the reservoir simulation grid may be performed. The hydrocarbon reservoir simulation may be a multiphase multi-component reservoir simulation and the hydrocarbon reservoir is a wet gas reservoir. The hydrocarbon simulation may include the simulation or modeling of multiple scenarios predicting the effects of changing fluid injection schedules or drilling new production and/or injection wells.

In Step 510, a hydrocarbon reservoir development plan may be formed and executed based, at least in part, on the fluid flow simulation results determined in Step 508. For example, the critical pressure at which condensates form may be utilized to develop a plan. After discovery and initial appraisal of a hydrocarbon reservoir or field, a hydrocarbon reservoir development plan may be formulated to facilitate the safe and efficient production of hydrocarbons from the reservoir. The plan may include defining the type, size, and location of surface facilities, such as production rigs, pipelines, and GOSPs. The plan may further include the type, surface location, and subsurface trajectory of wellbores, including horizontal wellbores, to be drilled to reach and penetrate the reservoir, and from which to produce hydrocarbons. The plan may also include specifying the type of completions to use, including whether wells should be cased, uncased, or contain slotted liners; whether hydraulic fracturing, acidizing, or both, is utilized, and whether surface or downhole pumps are needed to produce the hydrocarbons. The plan may still further determine whether the injection of fluid, typically water, is required at locations within the reservoir to raise, maintain, or slow the decline in reservoir pressure. Further, the plan may include enhanced recovery methods, such as the injection of water to maintain reservoir pressure above the pressure at which condensates form. The hydrocarbon reservoir development plan may be influenced by the assessment of geological, geographical, and economic factors.

Executing the hydrocarbon reservoir development plan may include carrying out the operations, such as constructing the surface facilities, drilling and completing the wells, pumping the injection fluids, and maintaining the reservoir pressure, specified in the plan. Executing the plan may further include updating the reservoir development plan based on production data and well logging acquired during preceding execution steps.

FIGS. 6-13 show steps and results from an illustrative example of one embodiment. FIG. 6A shows a horizontal portion (602) of a wellbore with a length of 1200 feet and a coarse grid reservoir simulation model with coarse grid cell sizes of 400×400 feet. In the following, the results generated with the model shown in FIG. 6A will be compared and contrasted with the results from a fine grid model shown in FIG. 6B and with the results from a combined elliptical and coarse grid simulation. The results generated using the fine grid model shown in FIG. 6B may be regarded as the best available estimate of the true or exact result.

Figure 6A:
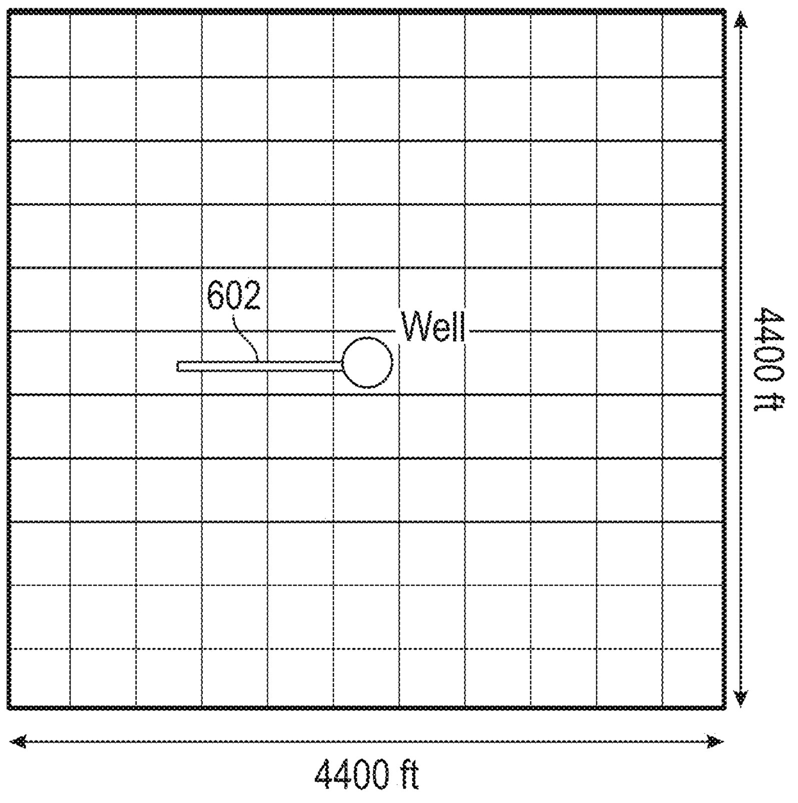
FIGS. 6A and 6B show grids in accordance with one or more embodiments.
Figure 6B:
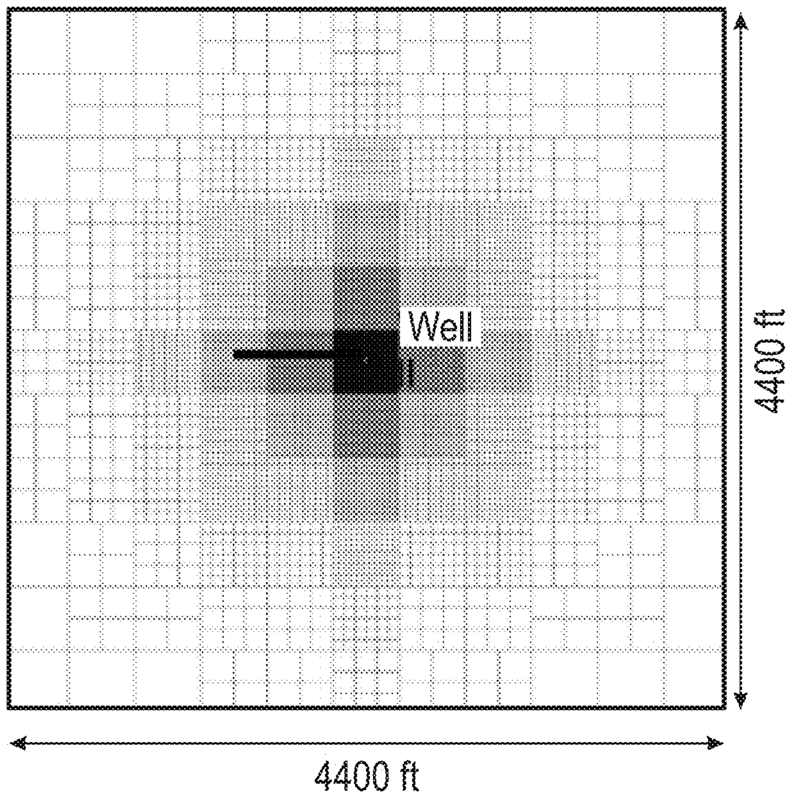
Figure 7A:
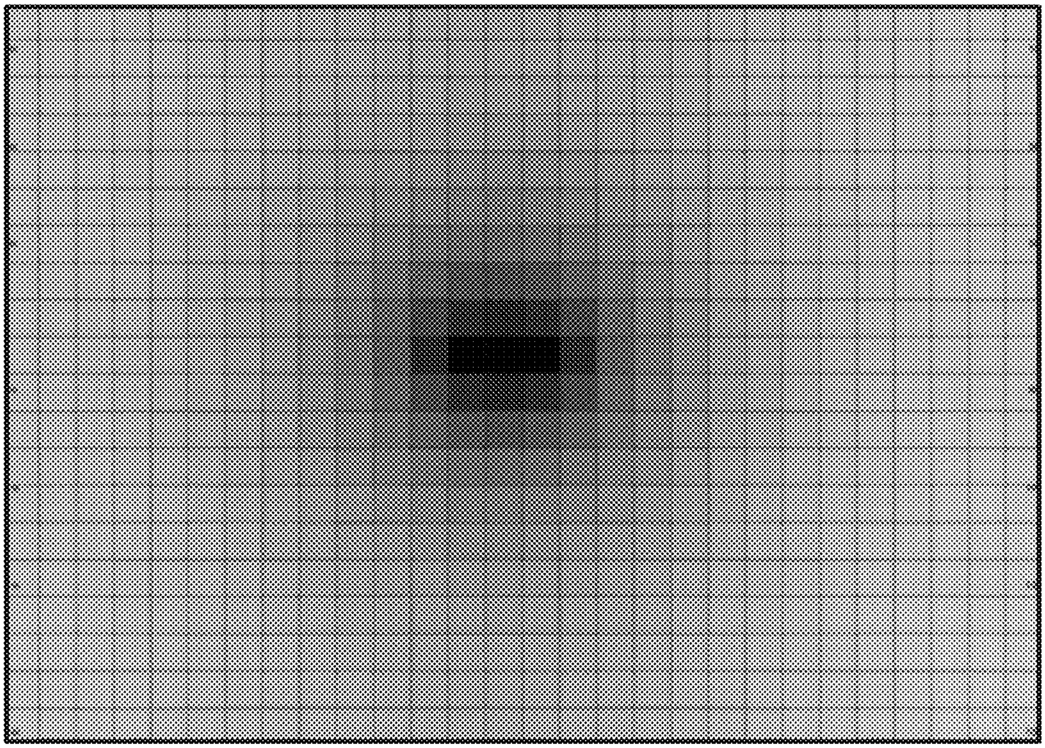
FIGS. 7A-7C show pressure distributions in accordance with one or more embodiments.
Figure 7B:
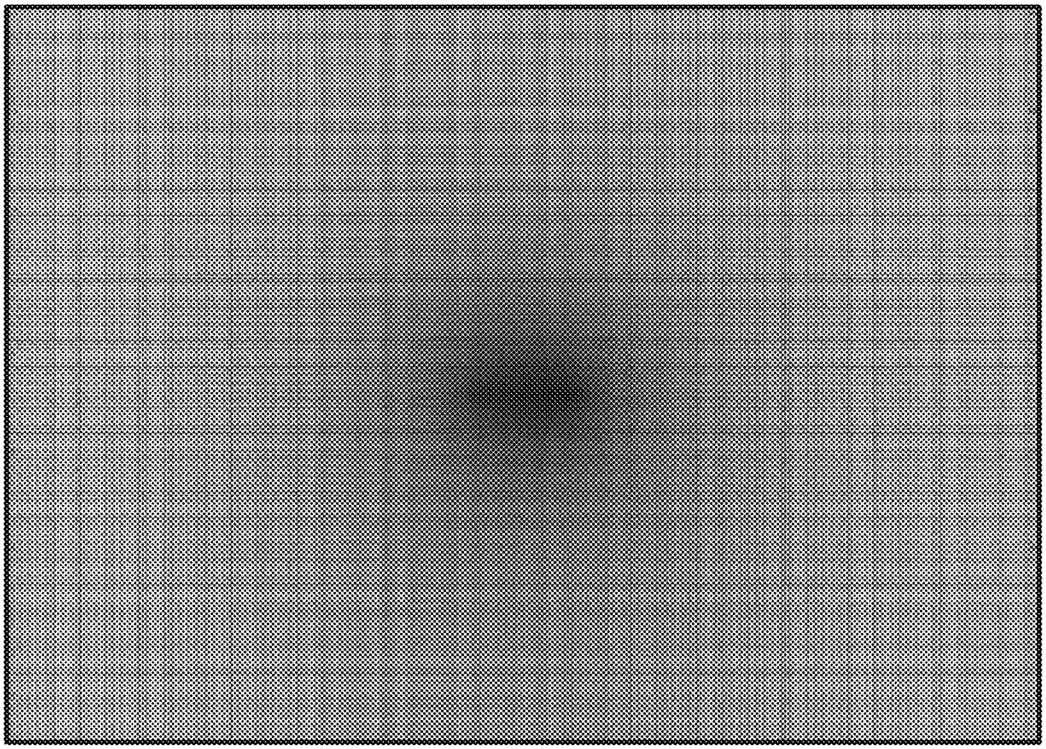
Figure 7C:
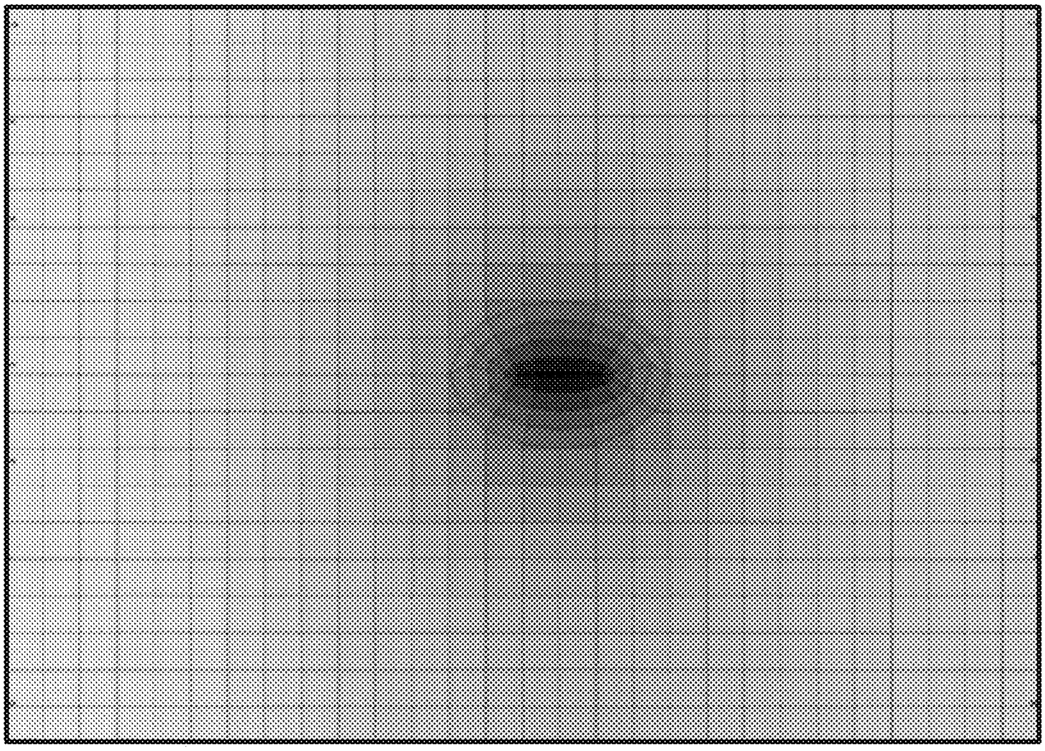

FIG. 7A shows the fluid pressure distribution in the reservoir after hydrocarbon production from the reservoir for a period of time as predicted using the coarse grid model shown in FIG. 6A. In contrast, FIG. 7B shows fluid pressure distribution in the reservoir after hydrocarbon production from the reservoir for the same period of time as predicted using the fine grid model shown in FIG. 6B. A person of ordinary skill in the art will readily appreciate the differences between the FIGS. 7A and 7B including the significantly larger zone of greatly decreased pressure shown in FIG. 7A. FIG. 7C shows both the reservoir simulation grid formed by combining the initial elliptical grid and coarse grid model, and the fluid pressure distribution in the reservoir after hydrocarbon production from the reservoir. FIGS. 7A-7C all show the results simulated for the same period of production time. One of ordinary skill in the art will readily appreciate the significantly greater similarity between FIGS. 7C and 7B than between FIGS. 7A and 7B.

Figure 8A:
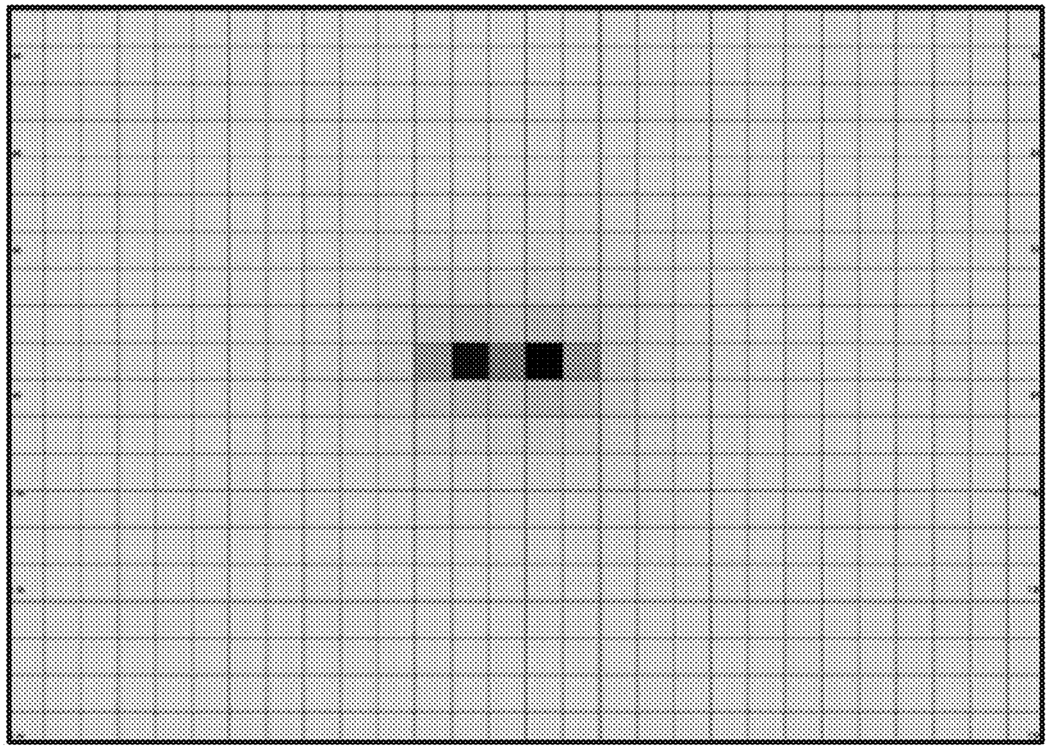
FIGS. 8A-8C show condensate distributions in accordance with one or more embodiments.
Figure 8B:
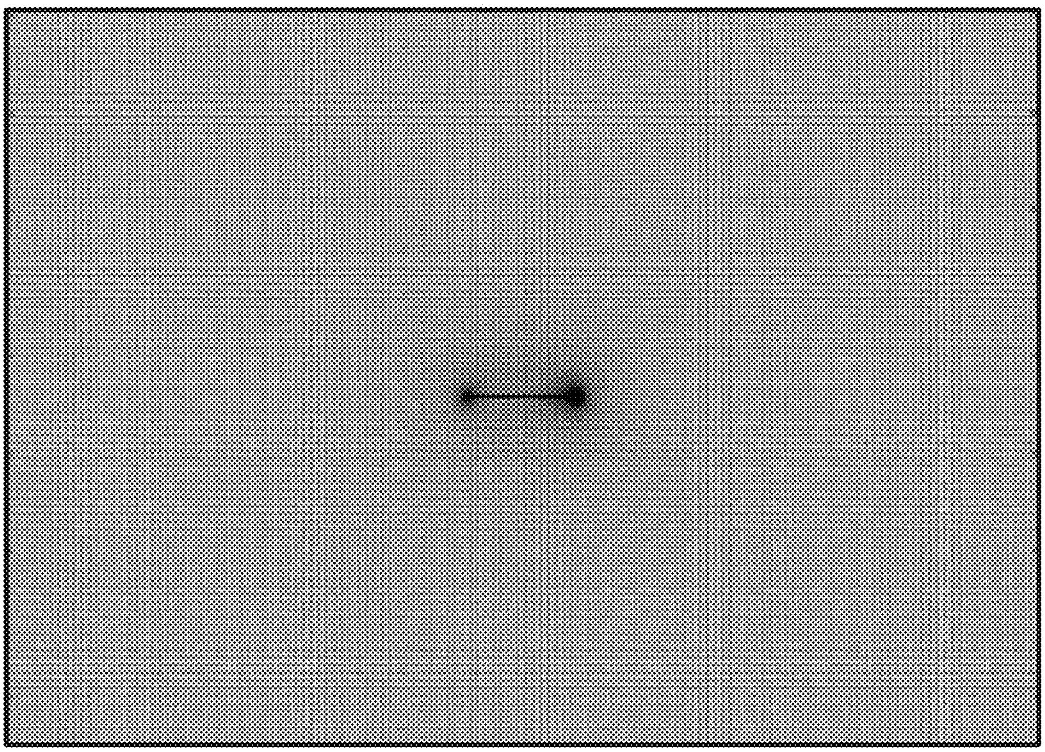
Figure 8C:
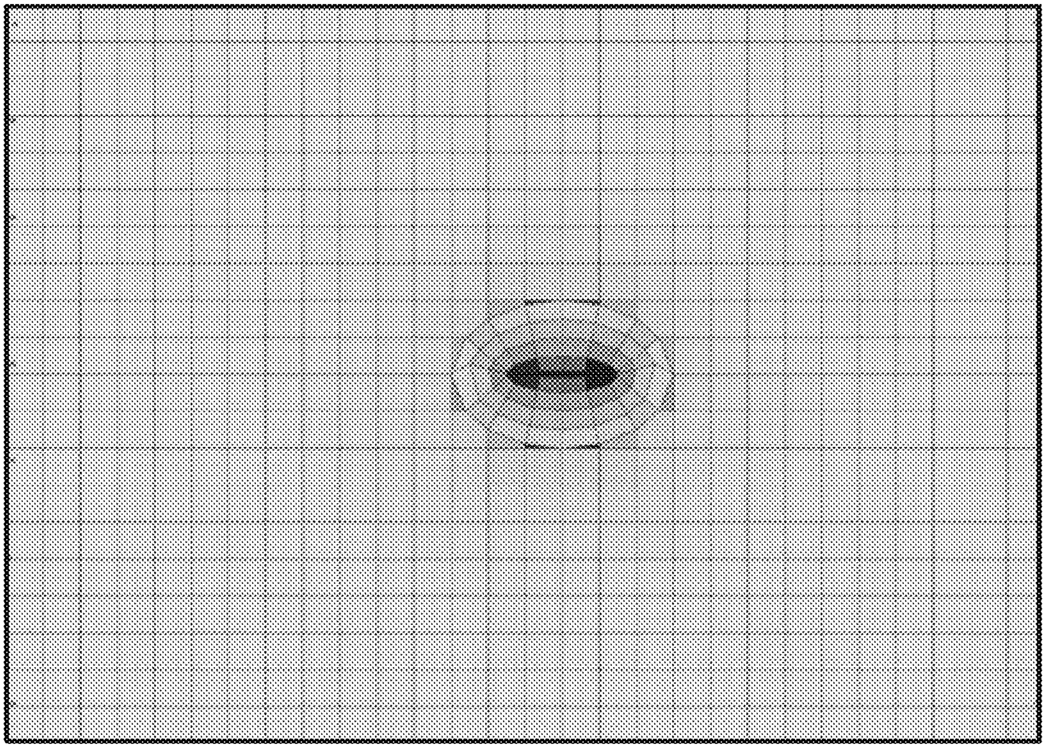

FIGS. 8A, 8B and 8C show the condensate saturation in the reservoir after hydrocarbon production from the reservoir for the same period of time. FIG. 8A shows the prediction formed using the coarse grid model. FIG. 8B shows the prediction formed using the fine grid model, and FIG. 8B shows the prediction formed using the combined elliptical and coarse grid model. A person of ordinary skill in the art will readily appreciate the significantly greater similarity between FIGS. 8C and 8B than between FIGS. 8A and 8B.

Figure 9:
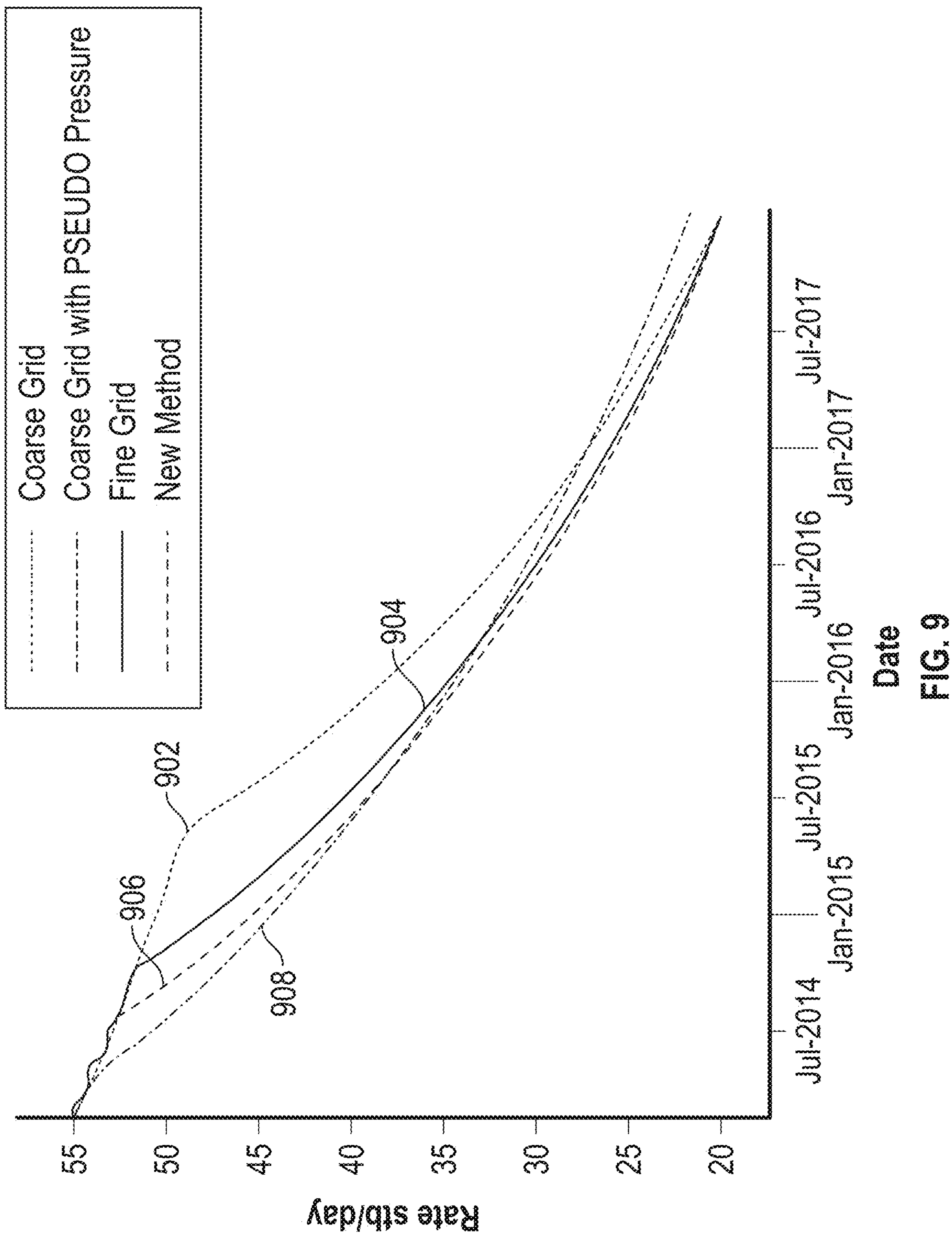
FIG. 9 shows condensate production rates in accordance with one or more embodiments.

FIG. 9 shows the condensate production rate over a four-year simulated production period as predicted using the coarse grid (902), the fine grid (904), the combined elliptical and coarse grid (906) and a modification of the coarse grid with a pseudo-pressure transform (908). It will be readily apparent to one of ordinary skill in the art that the condensate production rate calculated using the combined elliptical and coarse grid (906) is more similar to the condensate production rate calculated using the fine grid (904) than are either of the two methods using the coarse grid (902, 908).

Figure 10:
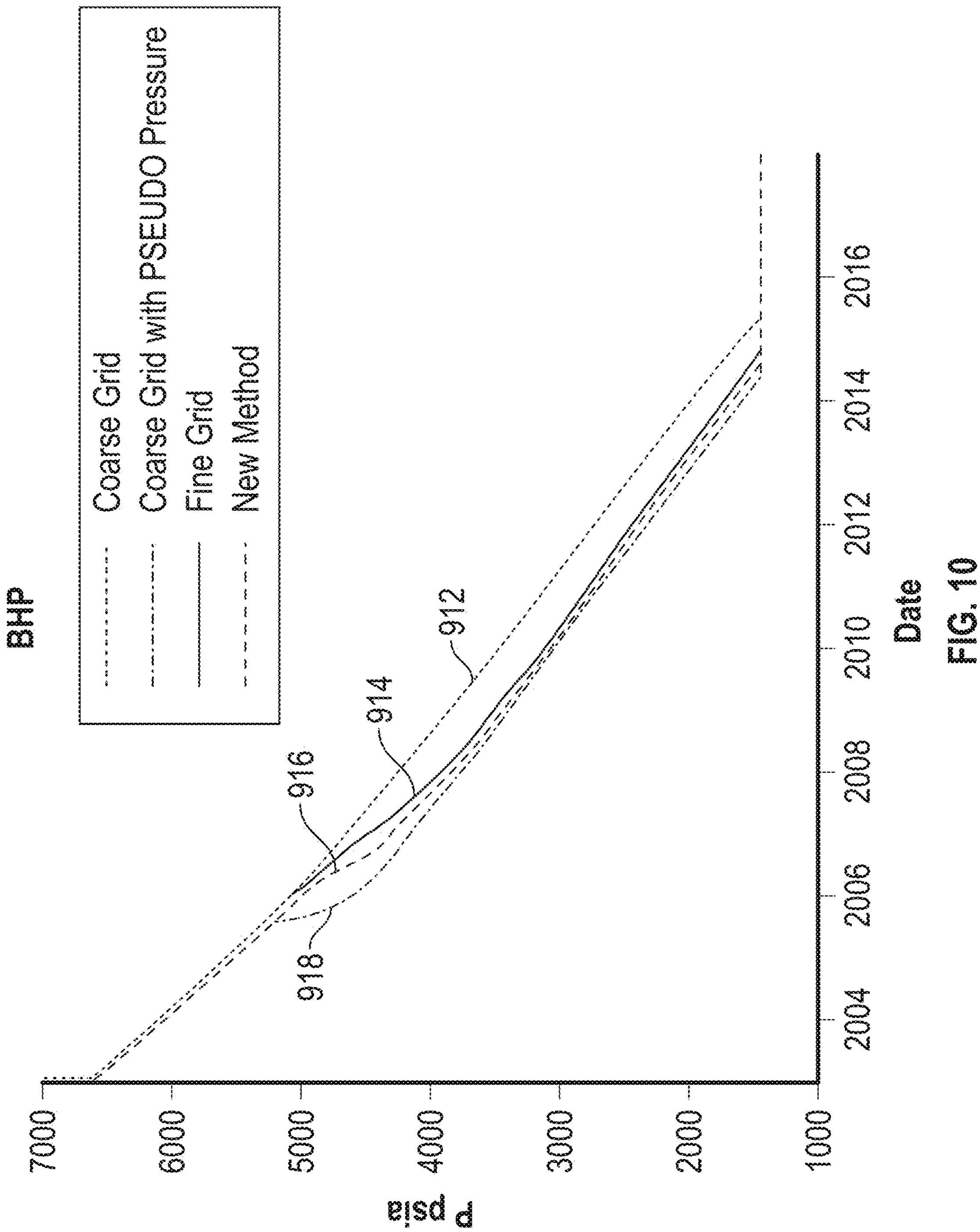
FIG. 10 shows bottom hole pressure in accordance with one or more embodiments.

FIG. 10 shows the bottom hole pressure over a four-year simulated prediction period as predicted using the coarse grid (1002), the fine grid (1004), the combined elliptical and coarse grid (1006) and a modification of the coarse grid with a pseudo-pressure transform (1008). It will be readily apparent to a person of ordinary skill in the art that the bottom hole pressure predicted using the combined elliptical and coarse grid (1006) is more similar to the condensate production rate calculated using the fine grid (1004) than are either of the two methods using the coarse grid (1002, 1008).

Figure 11:
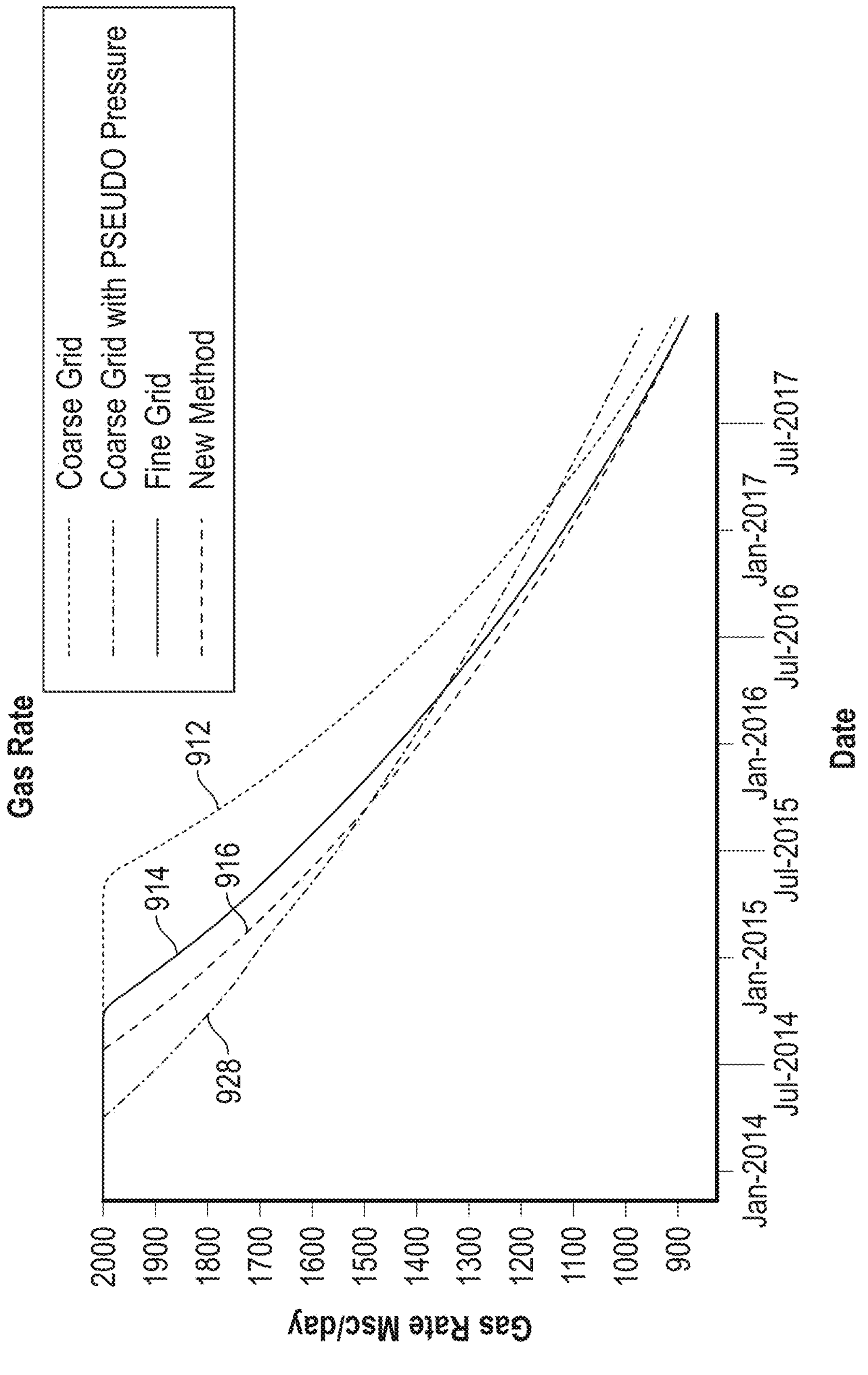
FIG. 11 shows gas production rates in accordance with one or more embodiments.

FIG. 11 shows the gas production rate over a four-year period as predicted using the coarse grid (1102), the fine grid (1104), the combined elliptical and coarse grid (1106) and a modification of the coarse grid with a pseudo-pressure transform (1108). It will be readily apparent to a person of ordinary skill in the art that the gas production rate predicted using the combined elliptical and coarse grid (1106) is more similar to the condensate production rate calculated using the fine grid (1104) than are either of the two methods using the coarse grid (1102, 1108).

Figure 12:
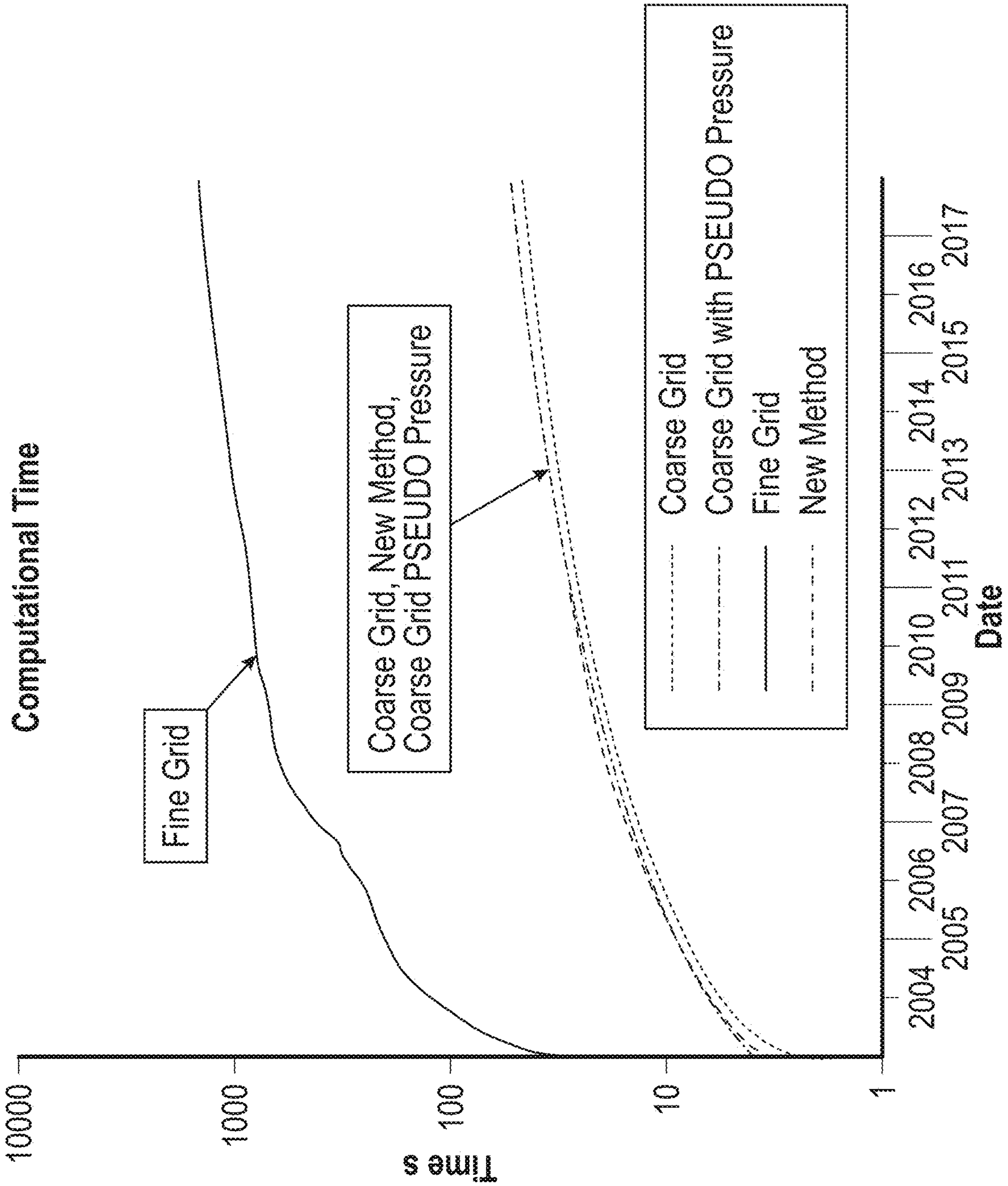
FIG. 12 shows computational times in accordance with one or more embodiments.

FIG. 12 shows the computational time required to generate the results shown in FIGS. 7-11. Note, the vertical axis (1202) of FIG. 12 is depicted on a logarithmic scale. FIG. 12 indicates, in accordance with one or more embodiments, that the computation time required for the fine grid simulation (1204) is approximately 20 times greater than the computational time than does the coarse grid model (1206), the combined coarse grid and elliptical grid embodiment (1208), or the coarse grid model supplemented by the pseudo-pressure transformation (1210).

Figure 13:
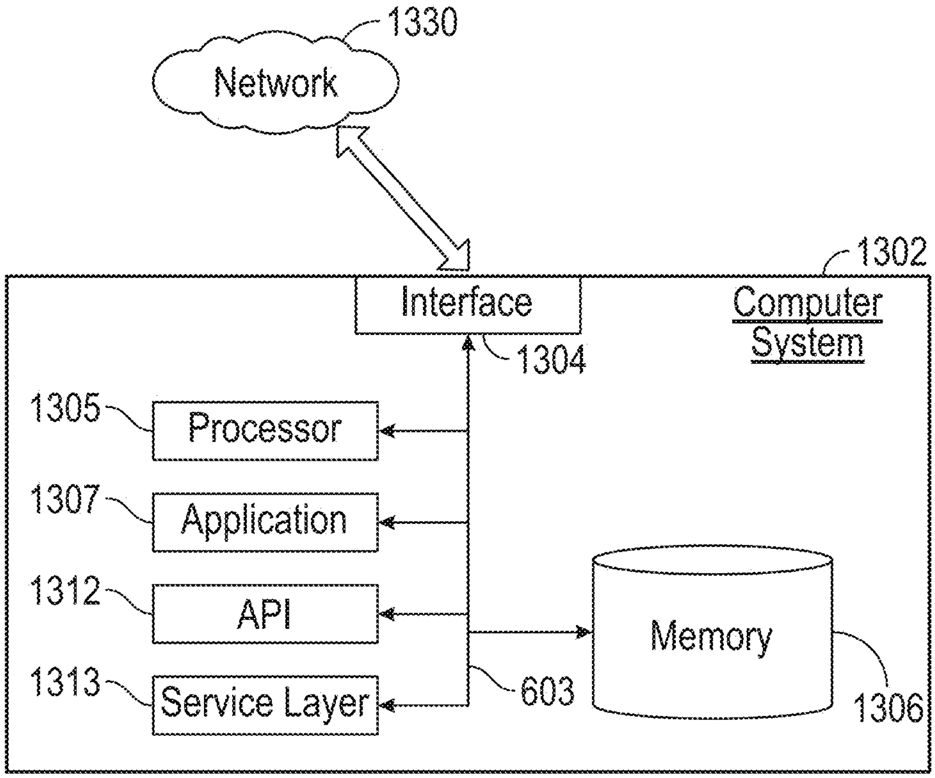
FIG. 13 shows computer systems in accordance with one or more embodiments.

Embodiments may be implemented on a computer system using reservoir simulation software stored in non-transitory computer readable media. FIG. 13 is a cell diagram of a computer system (1302) used to provide computational functionalities associated with described algorithms, methods, functions, processes, flows, and procedures as described in the instant disclosure, according to an implementation. The illustrated computer system (1302) is intended to encompass any computing device such as a high-performance computing (HPC) device, server, desktop computer, laptop, notebook computer, wireless data port, smart phone, personal data assistant (PDA), tablet computing device, one or more processors within these devices, or any other suitable processing device, including both physical or virtual instances (or both) of the computing device. Additionally, the computer system (1302) may include a computer that includes an input device, such as a keypad, keyboard, touch screen, or other device that can accept user information, and an output device that conveys information associated with the operation of the computer system (1302), including digital data, visual, or audio information (or a combination of information), or a graphical user interface GUI.

The computer system (1302) can serve in a role as a client, network component, a server, a database or other persistency, or any other component (or a combination of roles) of a computer system for performing the subject matter described in the instant disclosure. The illustrated computer system (1302) is communicably coupled with a network (1330). In some implementations, one or more components of the computer system (1302) may be configured to operate within environments, including cloud-computing-based, local, global, or other environment (or a combination of environments).

At a high level, the computer system (1302) is an electronic computing device operable to receive, transmit, process, store, or manage data and information associated with the described subject matter. According to some implementations, the computer system (1302) may also include or be communicably coupled with an application server, e-mail server, web server, caching server, streaming data server, business intelligence (BI) server, or other server (or a combination of servers).

The computer system (1302) can receive requests over network (1330) from a client application (for example, executing on another computer system (1302)) and responding to the received requests by processing the said requests in an appropriate software application. In addition, requests may also be sent to the computer system (1302) from internal users (for example, from a command console or by other appropriate access method), external or third-parties, other automated applications, as well as any other appropriate entities, individuals, systems, or computers.

Each of the components of the computer system (1302) can communicate using a system bus (1303). In some implementations, any or all of the components of the computer system (1302), both hardware or software (or a combination of hardware and software), may interface with each other or the interface (1304) (or a combination of both) over the system bus (1303) using an application programming interface (API) (1312) or a service layer (1313) (or a combination of the API (1312) and service layer (1313). The API (1312) may include specifications for routines, data structures, and object classes. The API (1312) may be either computer-language independent or dependent and refer to a complete interface, a single function, or even a set of APIs. The service layer (1313) provides software services to the computer system (1302) or other components (whether or not illustrated) that are communicably coupled to the computer system (1302). The functionality of the computer system (1302) may be accessible for all service consumers using this service layer. Software services, such as those provided by the service layer (1313), provide reusable, defined business functionalities through a defined interface. For example, the interface may be software written in JAVA, C++, or other suitable language providing data in extensible markup language (XML) format or another suitable format. While illustrated as an integrated component of the computer system (1302), alternative implementations may illustrate the API (1312) or the service layer (1313) as stand-alone components in relation to other components of the computer system (1302) or other components (whether or not illustrated) that are communicably coupled to the computer system (1302). Moreover, any or all parts of the API (1312) or the service layer (1313) may be implemented as child or sub-modules of another software module, enterprise application, or hardware module without departing from the scope of this disclosure.

The computer system (1302) includes an interface (1304). Although illustrated as a single interface (1304) in FIG. 13, two or more interfaces (1304) may be used according to particular needs, desires, or particular implementations of the computer system (1302). The interface (1304) is used by the computer system (1302) for communicating with other systems in a distributed environment that are connected to the network (1330). Generally, the interface (1304) includes logic encoded in software or hardware (or a combination of software and hardware) and operable to communicate with the network (1330). More specifically, the interface (1304) may include software supporting one or more communication protocols associated with communications such that the network (1330) or interface's hardware is operable to communicate physical signals within and outside of the illustrated computer system (1302).

The computer system (1302) includes at least one computer processor (1305). Although illustrated as a single computer processor (1305) in FIG. 13, two or more processors may be used according to particular needs, desires, or particular implementations of the computer system (1302). Generally, the computer processor (1305) executes instructions and manipulates data to perform the operations of the computer system (1302) and any algorithms, methods, functions, processes, flows, and procedures as described in the instant disclosure.

The computer system (1302) also includes a memory (1306) that holds data for the computer system (1302) or other components (or a combination of both) that can be connected to the network (1330). For example, memory (1306) can be a database storing data consistent with this disclosure. Although illustrated as a single memory (1306) in FIG. 13, two or more memories may be used according to particular needs, desires, or particular implementations of the computer system (1302) and the described functionality. While memory (1306) is illustrated as an integral component of the computer system (1302), in alternative implementations, memory (1306) can be external to the computer system (1302).

The application (1307) is an algorithmic software engine providing functionality according to particular needs, desires, or particular implementations of the computer system (1302), particularly with respect to functionality described in this disclosure. For example, application (1307) can serve as one or more components, modules, applications, etc. Further, although illustrated as a single application (1307), the application (1307) may be implemented as multiple applications (1307) on the computer system (1302). In addition, although illustrated as integral to the computer system (1302), in alternative implementations, the application (1307) can be external to the computer system (1302).

There may be any number of computers associated with, or external to, a computer system containing computer system (1302), each computer communicating over network (1330). Further, the term "client," "user," and other appropriate terminology may be used interchangeably as appropriate without departing from the scope of this disclosure. Moreover, this disclosure contemplates that many users may use one computer system (1302), or that one user may use multiple computers (1302).

Figure 14:
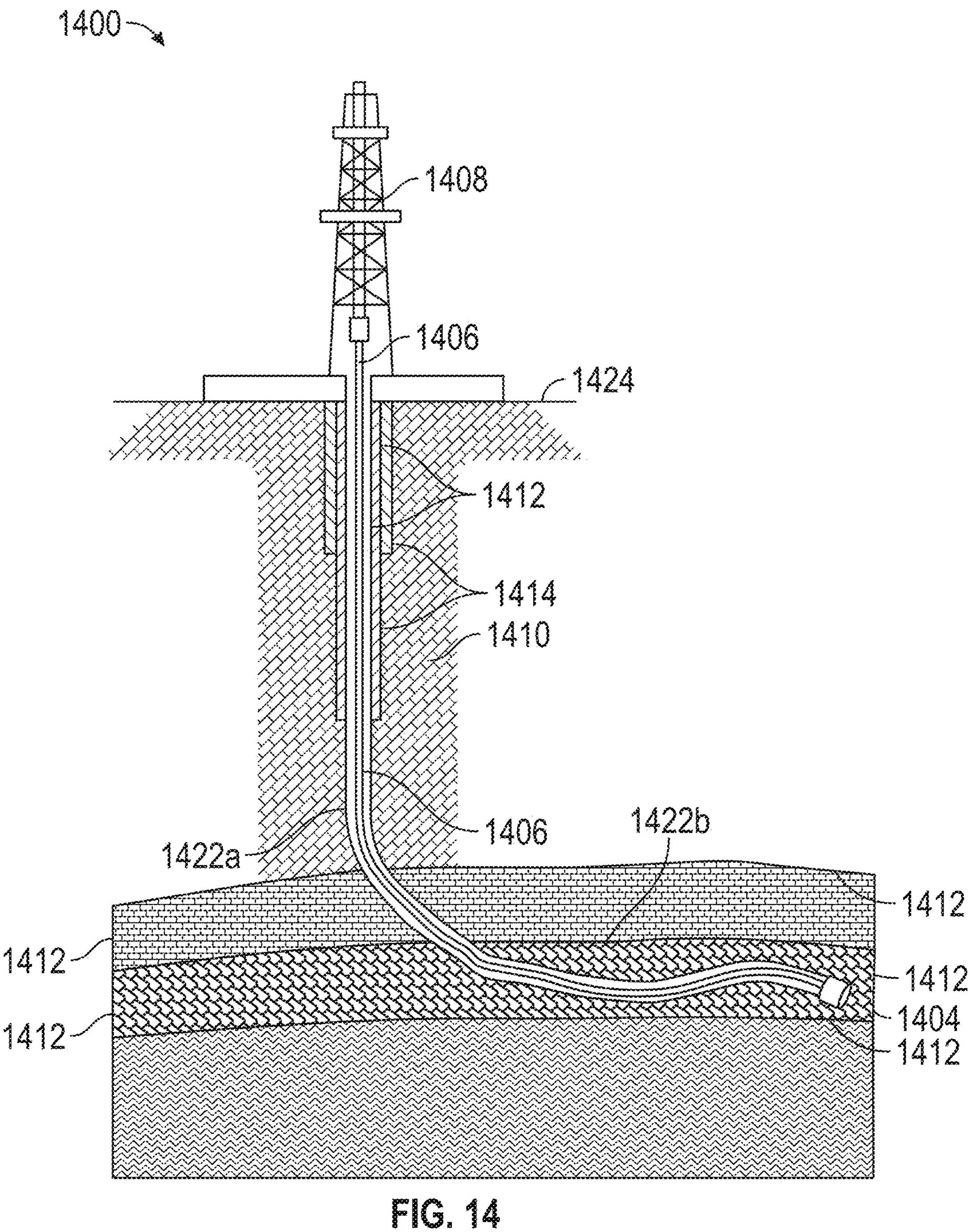
FIG. 14 shows a drilling system in accordance with one or more embodiments.

FIG. 14 illustrates a drill system (1400), in accordance with one or more embodiments. A wellbore (1422*a, b*) may be drilled using a drill bit (1404) attached to a drillstring (1406) further attached to a drill rig (1408) located on the surface of the earth (1424). The wellbore (1422*a, b*) may traverse a plurality of overburden layers (1410), one or more cap-rock layers (1412), and geological discontinues (1412) to reach a hydrocarbon reservoir region (230). The wellbore (1422*a, b*) may be drilled according to a wellbore plan along a wellbore trajectory defined in the well plan and may include portions of wellbore that are essentially vertical (1422*a*) and portions of wellbore that are highly deviated or horizontal (1422*b*). In particular, horizontal portions of the wellbore (1422*b*) may be drilled in the hydrocarbon reservoir (230) to maximize the production of hydrocarbons from the wellbore.

In addition to the wellbore trajectory, the well plan may provide for other characteristics of the well. For example, the well plan may provide for the wellbore to be drilled in portions. After drilling each portion the drill bit (1404) and the drillstring (1406) may be withdrawn from the wellbore (1422*a*) by the drill rig (1408) and a "casing string" (1402) may be lowered into the wellbore (1422*a*) and cemented into place by injecting cement into the annulus (1414) formed between the casing string (1402) and the formation (1410). Casing strings are composed of a plurality of steel pipes casing joints threaded together, where each casing joint is a steel pipe approximately 30 feet long. The casing joints may be screwed together as the casing string is inserted into the wellbore. Once the casing string is cemented in place the drillstring (1406) and the drill bit (1404) may be re-inserted through the central channel of the casing string (1412) and the next portion of the wellbore (1422*a, b*) may be drilled. Typically, each portion of the wellbore (1422*a*) is of a smaller diameter than the previous portion. For example, the first portion of the wellbore (1422*a*) near the surface of the earth may have a diameter of 2 or 3 feet, while the final portion of the wellbore that intersects the hydrocarbon reservoir (1422*b*) may have a diameter of 6 or 8 inches. These diameter values are provided for illustrative purposes only and should not be construed as limiting the scope of the invention in any way.

Once installed, the casing may provide mechanical strength and stability to the wellbore (1422*a, b*), to precent the collapse of overburden layers (1410) and cap-rock layers (1412). Further, casing may isolate fluid in the pores of one overburden layer from the pores in another. In addition, casing may aid in the control of pressure and prevent unwanted fluid flow from pores within a formation into the wellbore (1422*a, b*).

A well plan may be determined by a wellbore planning system composed of a computer system, such as computer system (1302) and appropriate software. The well planning system may take as input a well head on the surface of the earth, a drilling target within the reservoir, the location of drilling hazards (such as shallow gas pockets, pre-existing well trajectory and fault planes), the mechanical limitations of the drill rig and the drillstring (such as the tolerable maximum curvature), and geoscience data such as the expected pore pressure distribution with depth).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of simulating fluid flow in a hydrocarbon reservoir, comprising:

obtaining a coarse grid model of the hydrocarbon reservoir and a trajectory of a wellbore that penetrates the hydrocarbon reservoir;

determining a fluid pressure distribution using the coarse grid model;

determining an initial grid surrounding the trajectory, wherein a first axis of the initial grid approximates isobars of the fluid pressure distribution, and wherein a second axis of the initial grid approximates streamlines of the fluid pressure distribution;

constructing a reservoir simulation grid, wherein the reservoir simulation grid:

conforms to the initial grid in a first region in a vicinity of the wellbore, wherein the first region is interior to a bounding box, and conforms to the coarse grid model in a second region, wherein the second region is exterior to the bounding box, and wherein the reservoir simulation grid in the first region and the reservoir simulation grid in the second region are connected by an irregular transitional grid; and performing a hydrocarbon reservoir simulation, modeling a flow of fluid in the hydrocarbon reservoir based, at least in part, on the reservoir simulation grid.

2. The method of claim 1, further comprising forming and executing a hydrocarbon reservoir production plan based, at least on part, on the hydrocarbon reservoir simulation.

3. The method of claim 1, wherein performing the hydrocarbon reservoir simulation comprises performing a multiphase multi-component reservoir simulation.

4. The method of claim 1, wherein the hydrocarbon reservoir is a wet gas reservoir.

5. The method of claim 1, wherein the first axis of the initial grid comprises an ellipse.

6. The method of claim 5, wherein the second axis of the initial grid is locally orthogonal to the ellipse.

7. A non-transitory computer readable medium storing instructions for simulating fluid flow in a hydrocarbon reservoir, the instructions executable by a computer processor, comprising functionality for:

obtaining a coarse grid model of the hydrocarbon reservoir and a trajectory of a wellbore that penetrates the hydrocarbon reservoir;

determining a fluid pressure distribution using the coarse grid model;

determining an initial grid surrounding the trajectory, wherein a first axis of the initial grid approximates isobars of the fluid pressure distribution, and wherein a second axis of the initial grid approximates streamlines of the fluid pressure distribution;

constructing a reservoir simulation grid, wherein the reservoir simulation grid:

conforms to the initial grid in a first region in a vicinity of the wellbore, wherein the first region is interior to a bounding box, and conforms to the coarse grid model in a second region, wherein the second region is exterior to the bounding box; and wherein the reservoir simulation grid in the first region and the reservoir simulation grid in the second region are connected by an irregular transitional grid; and performing a hydrocarbon reservoir simulation, modeling a flow of fluid in the hydrocarbon reservoir based, at least in part, on the reservoir simulation grid.

8. The non-transitory computer readable medium of claim 7, further comprising instructions for forming a hydrocarbon reservoir production plan based, at least on part, on the hydrocarbon reservoir simulation.

9. The non-transitory computer readable medium of claim 7, wherein performing the hydrocarbon reservoir simulation comprises performing a multiphase multi-component reservoir simulation.

10. The non-transitory computer readable medium of claim 7, wherein the hydrocarbon reservoir is a wet gas reservoir.

11. The non-transitory computer readable medium of claim 7, wherein the first axis of the initial grid comprises an ellipse and the second axis of the initial grid is locally orthogonal to the ellipse.

12. A system comprising:

a reservoir simulator, configured to:

obtain a coarse grid model of a hydrocarbon reservoir and a trajectory of a wellbore that penetrates the hydrocarbon reservoir, determine a fluid pressure distribution using the coarse grid model, determine an initial grid surrounding the trajectory, wherein a first axis of the initial grid approximates isobars of the fluid pressure distribution; and wherein a second axis of the initial grid approximates streamlines of the fluid pressure distribution, construct a reservoir simulation grid, wherein the reservoir simulation grid:

conforms to the initial grid in a first region in a vicinity of the wellbore, wherein the first region is interior to a bounding box; and conforms to the coarse grid model in a second region, wherein the second region is exterior to the bounding box; and wherein the reservoir simulation grid in the first region and the reservoir simulation grid in the second region are connected by an irregular transitional grid, perform a hydrocarbon reservoir simulation, modeling a flow of fluid in the hydrocarbon reservoir based, at least in part, on the reservoir simulation grid;

develop a hydrocarbon reservoir production plan based, at least on part, upon the hydrocarbon reservoir simulation; and a well planning system configured to determine a planned wellbore trajectory based upon the hydrocarbon reservoir production plan.

13. The system of claim 12, further comprising a drilling system configured to drilling the wellbore guided by the planned wellbore trajectory.

14. The system of claim 12, further comprising a pumping system configured to pump a fluid injection program based, at least in part, upon the hydrocarbon reservoir production plan.

15. The system of claim 12, wherein the hydrocarbon reservoir is a wet gas reservoir.

16. The system of claim 12, wherein the first axis of the initial grid comprises an ellipse.

17. The system of claim 16, wherein the second axis of the initial grid is locally orthogonal to the ellipse.

* * * * *